Patented May 18, 1948

2,441,729

UNITED STATES PATENT OFFICE 2,441,729

ALGIN GEL-FORMING COMPOSITIONS

Arnold B. Steiner, La Jolla, Calif., assignor to Kelco Company, San Diego, Calif., a corporation of Delaware No Drawing. Application December 8, 1943, Serial No. 513,643

15 Claims. (Cl. 99—131)

This invention pertains to the formation of gelatinous products by the interaction of alginates with certain salts, notably the salts of calcium.

The primary purpose of the invention is to control the time required for gelatinization to occur and the consistency of the gel so produced.

A purpose of the invention is to produce gels having any desired degree of acidity.

The products of the invention are compositions which may be used, in either the hot or the cold way, for making a wide variety of edible products such as fruit jams and jellies, jellied salads and broths, water jelly desserts and candy jellies. Inedible jellies may also be made for various industrial purposes, such as gels for dental impressions, lubricating and insecticidal jellies and the like.

It is well known that water-soluble alginates react with soluble calcium salts to form the insoluble calcium alginate. Under some circumstances this product is gelatinous, but the reaction is of little use for the production of jellies. The reaction is extremely rapid, cannot be controlled effectively and ordinarily yields a product of grainy or even granular consistency.

It is also known to restrain the formation of calcium alginate by the addition to the above reactants of a buffer salt, such as one of the alkali metal phosphates. This procedure is not satisfactory for my present purpose. To produce any material extension of the setting time requires a large proportion of the buffer salt, the course of the reaction is profoundly influenced by temperature changes, and the product is loaded with mineral salts to a degree undesirable for food products.

It is also known to use as a source of calcium a slowly soluble salt such as calcium sulfate. This reaction is usually too fast to be useful for the present purpose, calls for the use of a large excess of the calcium salt, and produces only gels having a strongly alkaline reaction. In the method herein described, only a minor proportion of the calcium or other gel-forming salt is used, and the product may range from neutral to a strongly acid reaction.

I have discovered that by the use, with a soluble salt of alginic acid, of a salt (of calcium, for example) which is only very slightly ionizable or unionizable in an aqueous medium, together with a weakly acid substance or a substance which produces free acid in aqueous solution, I am enabled to produce a gel of any desired consistency and degree of acidity, from hot to cold solutions, with complete control of the setting time, and either with or without the addition of sugars. These results have not, so far as I am aware, been produced heretofore.

The materials which I use, and the ranges of equivalence so far as I presently know them, are in detail as set forth immediately below:

(1) A water-soluble algin. This may be the alginate of ammonium, magnesium, potassium, sodium or other alkali metal, or the alginate of an organic base such as mono-, di- or tri-ethanolamine, aniline, etc. These soluble algins may be prepared by well known methods such as disclosed in the following United States Patents: 1,814,981, Thornley & Walsh, July 14, 1931; 2,036,922, Clark & Green, April 7, 1936; 2,039,934, Green, April 7, 1936; and 2,128,551, Le Gloahec, August 30, 1938.

The viscosity of the algin is not critical, though the higher viscosity algins form stronger gels than those of lower viscosity. As the compositions are usually prepared in the dry form, the algin is comminuted. The most favorable grain size depends on the usage of the composition. Thus, when used in boiling solution, as in making candy jellies, a 40 Tyler mesh product is suitable, while for use in gels made with cold water a finer mesh is preferable as hastening solution, as for example a grain size passing a 150 mesh screen.

(2) A salt, preferably of calcium, which either is insoluble or very slightly soluble in water, or which in aqueous solution is only slightly ionized, or both, and which on the addition of an acid yields cations which gelatinize alginates. This might otherwise be defined as an algin-gelatinizing salt having a low solubility product. In still other words, the salt in an aqueous medium must not yield any material number of the cations which gelatinize the algenic component until a definite step, the addition of the acid component, is performed.

Examples are tricalcium phosphate, dicalcium phosphate, calcium sulfate, calcium oxalate and calcium alginate. Salts of the other alkali-earth metals (with the exception of magnesium, which forms water-soluble alginates) may be substituted for the calcium salts. Many of the heavy metals may be substituted for calcium, but not as a rule in edible compositions as most of these metals are more or less toxic.

Up to this time I have obtained my best results in the use of tricalcium phosphate, calcium tartrate or calcium alginate in preparing various gelatinized food products.

(3) A weakly acidic substance: to-wit, a weak free acid, or a substance which liberates acid on solution in water. In the list of weak acids may be named acetic, citric, glutaric, lactic, succinic, tartaric, gluconic and alginic. Substances which yield free acid on solution in water include, first, the acid lactones, of which d-glucono lactone is an example; second, the acid or "bi" salts of the alkali metals with some of the organic acids, as for example the bitartrates of potassium and sodium, potassium binoxalate and biphthalate, sodium bisulfite and ammonium bimalate. Where the use of a solid acidic substance is desirable, I have obtained my best results in the use of d-glucono lactone and the acid tartrates.

The free acids and the acid salts and lactones function in a somewhat different manner, as will be pointed out hereinafter.

(4) A gel-inhibiting or gel-retarding salt. The purpose of the gel-retarding salt (retarder) is, first, to repress the ionization of the gel-forming salt until the acidic ingredient is added and, thereafter, to retard the liberation of the gel-forming (e. g., calcium) cations.

This component may be one of the alkali metal salts of such acids as acetic, citric, and the various phosphoric acids. These tend to inhibit gel formation by reason of their buffer action, their alkalinity, their common ion effect or a combination of these effects. In general these inhibitors are salts of weak acids.

Thus, for example, if tricalcium phosphate is used to furnish the gelling calcium cations, the addition of trisodium phosphate maintains the alkalinity sufficiently high to prevent premature solution of the calcium phosphate and the common phosphate ions tend to repress ionization of the calcium salt. The use of a mixture of monobasic and dibasic sodium phosphates likewise exerts these effects and, upon addition of a relatively strong acidic ingredient, maintains through buffer action a moderate acidity which tends to permit gradual release of the calcium ions with attendant gradual setting of the calcium gel.

Particularly favorable mixtures for this purpose have been found to be (1) a mixture of Calgon (sodium hexametaphosphate), disodium phosphate and monosodium phosphate, and (2) a mixture of Calgon with trisodium phosphate. While the hexametaphosphates of the other alkali metals are not articles of commerce at this time, there is every reason to believe that they will be functional, equally with the sodium salt, when they are obtainable.

There is much latitude in the use of these inhibitors, depending on the nature of other ingredients used and the manner in which the composition is used. In some cases the use of an inhibitor is unnecessary.

The function of each ingredient of the composition and the difference in functionality between free acids and the substances which yield acid on solution in water should be pointed out.

In all cases the soluble alginate (ingredient #1) is the source of algin and the calcium salt (#2) the source of the calcium required to gelatinize the algin by converting it into the insoluble calcium alginate. I have found it desirable, in most cases, to use less than the stoichimetric equivalent of calcium or other gel-forming salt, as tending to the production of clear gels.

On the addition of a free acid the calcium salt is slowly ionized to yield calcium ions, these free ions immediately reacting with the soluble alginate to form insoluble calcium alginate. As the calcium ions are removed from solution in this manner, more are liberated and thus gelation proceeds through the gradual ionization of the calcium salt, and the rate of gelation will be governed by the rate at which this ionization takes place. This, in turn, is governed by the inherent ionizability of the calcium salt, on the strength and concentration of the acid used, on the temperature obtaining, and on the nature and amount of the gel-retarding salt. As the temperature is ordinarily fixed by the nature of the final product to be made, the speed of gelation will mainly be controlled by the selection of calcium salt and acid and, finally, by the use of inhibitors (ingredient #4) which are ordinarily required in the use of free acid.

When the third ingredient is a substance which yields acid on being placed in aqueous solution, rather than a free acid, the reactions take place in three stages instead of the two above described. The first stage is the dissociation of the acid-yielding substance with the gradual liberation of free acid; the second the ionization of the calcium salt by the acid thus set free, and the third the formation of calcium alginate. In this case the rate of gelation may be governed either by the rate at which the acid-yielding substance dissociates or by the rate at which the liberated acid ionizes the calcium salt, and the selection of an acid-yielding body having a low dissociation rate may be made the governing factor in retarding the rate of gelation.

It will be understood that in the above remarks the reference to calcium salts is intended to be illustrative only. The same principles apply in the use of the corresponding salts of the other alkali-earth metals and of the heavy metals.

The term "a salt whose cations . . . are no more than slightly liberated in water" is intended to cover the type of salt above described, having a low solubility product. The desired effect of restricting the presence of free calcium or similar cations to the lowest possible terms may be realized through low solubility, or low ionizability, or more often through both of these characteristics. It is conceivable, however, that a substance might be completely ionized in water and yet furnish only a negligible number of cations, due to its extremely low solubility. On the other hand, a much more soluble substance might yield the same negligible number of cations by reason of its low inherent ionizability. It is preferred to use a substance for this purpose which has a solubility product not higher than $10^{-4}$ at 25° Cent.

The manipulation of these mixtures may take two forms, depending on the physical condition of the acidic substance (ingredient #3) and on the temperature to which the composition is subjected after adding it to the water which makes up the bulk of the jelly.

If the acidic constituent be a solid, a lactone or bitartrate for example, and if the jelly is to be produced in the cold way, all four of the components may be mixed in one composition which will then produce the desired gel when added to water, fruit juice, syrup or other aqueous liquid. This is obviously impractical in the use of acetic, lactic, or other liquid acid. In the utilization of fruit juices, fairly heavy buffering may be required to prevent too rapid gelatinization, or even precipitation of calcium alginate.

It is also difficult, though not impossible, to handle a composition containing even a dry acidic component in cases where the composition is to be blended with a hot liquid, as in the making of candy jellies, by reason of the strong acceleration of the reactions by the high temperature. For working in the hot way, and in the use of liquid acids, we therefore prefer to mix the soluble alginate, the calcium salt and the retarding agent (if any), to bring the mixture into aqueous solution at convenience, and to add the acidic constituent only when ready to bring about the setting reaction.

The admixture of the three or four components, as the case may be, prior to introduction to the water or aqueous liquid, is a matter of convenience only and the components may be added to the liquid separately if preferred. From the standpoint of the use, it is a real advantage to have as many as possible of the constituents blended in advance in the proportions in which they give the best results for some specific use or type of use. I therefore aim to produce mixtures of the four components, the utility of which is somewhat circumscribed, and mixtures of three of the components, the fourth being withheld for separate addition, useful under all conditions.

Following are examples of compositions adapted to the manufacture of edible gelatinized products by both the hot and the cold methods. All formulae are in parts by weight.

*Example 1.—Candy jelly—hot method*

| | | Parts |
|---|---|---|
| (1) Sodium alginate | | 46 |
| (2) Tricalcium phosphate | | 3 |
| (4) Monosodium phosphate | parts | 17 |
| Disodium phosphate | do | 17 |
| | | — 34 |
| (3) d-Glucono lactone | | 17 |
| Sucrose | | 1,800 |
| Glucose (80% solids) | | 1,800 |
| Water | | 2,400 |

Components 1—2—4 are mixed and added to the boiling water, in which the soluble components of the mixture dissolve almost immediately, in about one minute. The sugar is then added and followed by the glucose, the syrup being boiled up after each addition. The temperature of the syrup is then raised to about 221° F. and any desired coloring and flavoring ingredients added.

At this point the lactone (component #3), previously dissolved in a small quantity of water, is stirred into the cook, which may then be poured into suitable molds. The mixture remains thin enough to pour readily for about one hour after adding the lactone and setting is complete in about three hours. More rapid setting may be produced by reducing the proportion of component #4.

The product of this operation is a clear, smooth candy jelly which maintains an unchanged consistency over a wide range of temperature. The sodium alginate used in this mixture was ground to pass a 40 mesh screen and its aqueous solution of 1% concentration has a pH value of 7.0 and a viscosity of 550 centipoises.

The above formula may be modified, without changing the final result, by substituting 21 parts of sodium bitartrate for the 17 parts of d-glucono lactone.

The sugar and glucose in the above product are added solely for their sweetening and bodying effects, for the specific purpose of making a candy jelly. A formula adapted to the preparation of an unsweetened gel is given below.

*Example 2.—Unsweetened gel—hot method*

| | | Parts |
|---|---|---|
| (1) Sodium alginate | | 50.4 |
| (2) Tricalcium phosphate | | 3.4 |
| (4) Disodium phosphate | parts | 8.4 |
| Sodium acetate | do | 16.8 |
| | | — 25.2 |
| (3) d-Glucono lactone | | 21.0 |
| Water | | 2,600 |

Components 1—2—4 are mixed and stirred into the water at boiling point, dissolving in a couple of minutes. The solution is boiled up and the lactone stirred in. A strong, clear gel is formed in about two hours.

It is not necessary to work with boiling water, but to hasten solution in cold water it is desirable to add a dispersing agent for the alginate, sucrose being effective for this purpose.

*Example 3.—Cold water gel*

| | Parts |
|---|---|
| (1) Ammonium alginate | 11 |
| (2) Tricalcium phosphate | 1 |
| (3) d-Glucono lactone | 85 |
| (4) Sodium hexametaphosphate | 3 |
| Sucrose | 235 |
| Water | 1,100 |

The five components of this composition are mixed dry and reduced to a fine mesh. The mixture is stirred into the water at room temperature (say 70° F.) in which it dissolves rapidly. A firm, smooth gel is formed in about ten minutes. If the sweet taste of the sugar is to be avoided, dextrin may be substituted. The large excess of the acidic ingredient is used, in this instance, to give a clear gel, the medium being cold and this particular acidic substance being converted to a free acid only slowly.

*Example 4.—Cold water gel*

| | | Parts |
|---|---|---|
| (1) Sodium alginate | | 38.9 |
| (2) Tricalcium phosphate | | 2.6 |
| (4) Disodium phosphate | parts | 14.6 |
| Trisodium phosphate | do | 14.6 |
| Sodium hexametaphosphate | do | 7.3 |
| | | — 36.5 |
| (3) Lactic acid (50%) | | 22.0 |
| Sucrose, not over | | 300 |
| Water | | 2,000 |

Components 1—2—4 are stirred into water at atmospheric temperature. When solution is complete component #3 is added. The magma is thin enough to pour after thirty minutes and gelation is complete in about one hour from the time the acid is added.

Example 5.—Cold water gel

| | Parts |
|---|---|
| (1) Sodium alginate | 52.8 |
| (2) Tricalcium phosphate | 3.5 |
| (4) Trisodium phosphate ____parts__ 4.4 | |
| Sodium hexametaphosphate _____do____ 9.9 | |
| | 14.3 |
| (3) Lactic acid (50%) | 29.4 |
| Sucrose, not over | 300 |
| Water | 2,900 |

This composition, when manipulated in the same manner as in Example 4, gives the same result as to setting time and character of gel. By increasing the dosage of sodium hexametaphosphate to 15.2 parts the setting time is approximately doubled.

The sugar may be omitted from the formulae of either Example 4 or Example 5 if a wholly unsweetened gel is desired. Or either of these formulae may be used, in the same manner as Example 1, to make a candy jelly by the hot method, using sucrose and glucose in more or less equal parts and in a total proportion such as to give a product of the desired sweetness and body.

Example 6.—Hot water gel

| | Parts |
|---|---|
| (1) Sodium alginate | 21.3 |
| (2) Calcium alginate | 21.3 |
| (4) Monosodium phosphate __parts__ 10.6 | |
| Disodium phosphate _____do____ 10.6 | |
| Sodium hexametaphosphate _____do____ 12.1 | |
| | 33.3 |
| (3) Lactic acid (50%) | 25.1 |
| Sucrose | 1,800 |
| Glucose | 1,800 |
| Water | 2,200 |

The water is brought to boiling and constituents 1—2—4 added. The sugars are then dissolved and finally the acidic component (#3) added with stirring. This blend was still thin enough to pour for an hour after adding the acid and set to a firm gel in about another hour.

Example 7.—Candy gel—hot method

| | Parts |
|---|---|
| (1) Sodium alginate | 57.2 |
| (2) Calcium tartrate | 3.8 |
| (4) Trisodium phosphate ____parts__ 4.8 | |
| Sodium hexametaphosphate _____do____ 11.4 | |
| | 16.2 |
| (3) Lactic acid, 75% | 22.8 |
| Sucrose | 1,800 |
| Glucose | 1,800 |
| Water | 2,400 |

When manipulated as described in connection with Example 1 this composition sets to a very firm, clear gel in about one hour. On increasing the calcium tartrate to 9.5 parts a stronger gel was obtained.

On substituting calcium sulfate (2H$_2$O) for the calcium tartrate in the above formula the magma thickened at the end of about five minutes and set in about one-half hour. The set may be retarded further by increasing the proportion of sodium hexametaphosphate.

Example 8.—Cold water gel

| | Parts |
|---|---|
| (1) Ammonium alginate | 11.6 |
| (2) Calcium pyrophosphate | 1.2 |
| (3) d-Glucono lactone | 87.2 |
| Sucrose | 230 |

These components are stirred into 1200 parts water at room temperature, yielding a gel of medium strength on standing over night. For the calcium pyrophosphate in the above formula, calcium sulfate (CaSO$_4$.2H$_2$O), or calcium tartrate, or barium sulfate may be substituted, all yielding gels of somewhat varying strength. These are examples of gels produced without the use of a retarder.

A convenient and highly desirable method for preparing these compositions for the consumer is illustrated in the following example:

Example 9.—Processed composition

| | Parts |
|---|---|
| (1) Sodium alginate | 71 |
| (2) Tricalcium phosphate | 5 |
| (4) Trisodium phosphate _____parts__ 6 | |
| Sodium hexametaphosphate _do____ 18 | |
| | 24 |
| Water | 300 |

The above components are mixed to form a water paste, which may be wet ground if desired to reduce the calcium salt to a state of extreme subdivision. The paste is then dried in thin sheets or after extrusion in threads through small orifices, after which it is granulated to pass a screen of say 40 mesh. The product of this operation is characterized by the intimate intermixture of the components, a minute part of each component being present in each granule.

The advantages of this procedure are that the solubility of the alginate is enhanced and the intimacy of dispersion of the calcium salt materially improved. A further advantage over simple mixtures of the dry powders is that the components of the processed mixture cannot stratify. This may occur in simple mixtures by reason of the wide difference in specific gravity between the alginate and the calcium salt.

The above composition may be used to make a candy jelly by the hot method, by adding 70 parts of the above to 2400 parts of boiling water, then adding 1800 parts each of sucrose and glucose and, finally, 30 parts 50% lactic acid or its equivalent in other acid yielding substance or acid. The details of the manipulation may be those recited in connection with Example 1.

The solubility of compositions prepared in this manner may be still further enhanced by incorporating sucrose or dextrin in the paste, and in this manner a granular product may be prepared which is almost instantly dispersible in water. This general method of preparation is not limited to the specific formula of Example 9 but may be used in connection with any of the three-component mixtures above described or any modification of them.

In preparing a processed composition, considerable manipulation may be saved by starting with alginic acid, as in the following example:

*Example 10.—Processed composition*

|  | Parts |
|---|---|
| 1) Alginic acid parts.. | 44 |
| Sodium carbonate do.... | 27 |
|  | — 71 |
| 2) Tricalcium phosphate | 5 |
| 3) Trisodium phosphate parts.. | 6 |
| Sodium hexametaphosphate do.... | 18 |
|  | — 24 |
| Water | 300 |

All of the above are dry weights and the water actually present in the wet alginic acid, together with any water of crystallization of the carbonate, should be allowed for. The alginic acid, sodium carbonate and the larger part of the water are mixed to form a pasty mass, the quantity of alkali being slightly varied, if necessary, to bring the hydrogen ion concentration of the paste within the range pH 7.0 to pH 8.0. The mixture of sodium phosphates is then dissolved in the remainder of the water, the finely ground tricalcium phosphate being added last. After thorough blending the mixture is dried and ground as above described.

The gels produced by the general methods above set forth are characterized by their clarity and firmness. They may be prepared in any desired consistency by varying the relation between the aqueous liquid and the added gelatinizing agents. Unless artificially flavored, these gels are substantially odorless and tasteless. As excess acid is neither necessary nor harmful to the gelling reactions, the products may be practically neutral or as acid as may be desired. The products have no tendency toward stickiness and may readily be removed from the molds in which they are shaped.

I claim as my invention:

1. The method of gelatinizing an aqueous liquid which comprises: introducing into said liquid a water-soluble salt of alginic acid, a salt whose cations form a water-insoluble salt with alginic acid and which has a solubility product not substantially exceeding $10^{-4}$ at 25° C., and a water-soluble alkali metal salt of a weak acid, and adding to said liquid a weakly acidic substance only after the introduction of said salts and after said water-soluble salts have passed into solution.

2. A method substantially as set forth in claim 1, in which said salt of alginic acid is sodium alginate.

3. A method substantially as set forth in claim 1, in which said salt whose cations form a water-insoluble salt with alginic acid is tricalcium phosphate.

4. A method substantially as set forth in claim 1, in which said alkali metal salt consists at least in part of sodium hexametaphosphate.

5. The method of gelatinizing an aqueous liquid initially substantially free from acidity which comprises: introducing into said liquid a water-soluble salt of alginic acid, a salt whose cations form a water-insoluble salt with alginic acid, an alkali metal salt of a weak acid and an acidic substance which liberates its hydrogen ions only slowly in contact with water.

6. A method substantially as set forth in claim 5, in which said salt of alginic acid is sodium alginate.

7. A method substantially as set forth in claim 5, in which said salt whose cations form a water-insoluble salt with alginic acid is tricalcium phosphate.

8. A method substantially as set forth in claim 5, in which said alkali metal salt consists at least in part of sodium hexametaphosphate.

9. A method substantially as set forth in claim 5, in which said acidic substance is an acid lactone.

10. A method substantially as set forth in claim 5, in which said acidic substance is di-glucono lactone.

11. The method of making a candy jelly which comprises: dissolving in water a minor proportion of an agent consisting substantially of a water-soluble alginate, a salt whose cations form a water-insoluble alginate and which has a solubility product not to exceed $10^{-4}$ at 25° C., and an alkali metal salt of a weak acid; heating the solution so formed and adding a major proportion of sugar; boiling the sugar-containing solution, and gelatinizing the boiled solution by adding thereto a minor proportion of a weakly acidic substance.

12. The method of making a sugar-free gel which comprises: dispersing in hot water an agent consisting substantially of sodium alginate, tricalcium phosphate, and an alkali metal phosphate; boiling the aqueous dispersion, and adding d-glucono lactone to the boiled liquid.

13. The method of making a cold-water gel which comprises: dispersing in water at substantially atmospheric temperature sodium alginate, tricalcium phosphate and an alkali metal phosphate; stirring until the water-soluble components pass into solution; adding to said solution a weakly acidic substance, and maintaining the mixture at substantially atmospheric temperature until gelation occurs.

14. The method of making a cold-water gel which comprises: dissolving in cold water a finely comminuted, dry mixture of a water-soluble alginate, tricalcium phosphate, d-glucono lactone, sodium hexametaphosphate and a dispersing agent selected from the group consisting of sucrose and dextrin, and maintaining the solution at substantially atmospheric temperature until gelation occurs.

15. An agent for gelatinizing an aqueous liquid: a comminuted, solid mixture comprising a water-soluble salt of alginic acid; a salt whose cations form a water-insoluble salt with alginic acid and which has a solubility product not exceeding $10^{-4}$ at 25° C.; d-glucono lactone, and a phosphate of an alkali metal.

ARNOLD B. STEINER.

REFERENCES CITED

The following references are of record in the file of this patent:

UNITED STATES PATENTS

| Number | Name | Date |
|---|---|---|
| Re. 19,719 | Hall | Oct. 8, 1935 |
| 1,814,986 | Walsh | July 14, 1931 |
| 2,010,340 | Williams et al. | Aug. 6, 1935 |
| 2,036,922 | Clark et al. | Apr. 7, 1936 |
| 2,059,541 | Thompson et al. | Nov. 3, 1936 |
| 2,064,387 | Schwartz | Dec. 15, 1936 |
| 2,076,036 | Leo | Apr. 6, 1937 |
| 2,334,281 | Olsen et al. | Nov. 16, 1943 |
| 2,405,861 | Tod | Aug. 13, 1946 |
| 2,420,308 | Gates | May 13, 1947 |